United States Patent [19]

West et al.

[11] Patent Number: 4,550,244
[45] Date of Patent: Oct. 29, 1985

[54] LARGE PLATE ARC WELDER

[75] Inventors: John D. West; James E. Trainor; James D. Karman, all of Manitowoc, Wis.

[73] Assignee: The Manitowoc Company, Inc., Manitowoc, Wis.

[21] Appl. No.: 536,787

[22] Filed: Sep. 28, 1983

[51] Int. Cl.[4] ............................................. B23K 9/02
[52] U.S. Cl. .................................. 219/158; 219/73.2; 219/136
[58] Field of Search ............... 219/158, 73 R, 73.2, 219/136, 137.2

[56] References Cited

U.S. PATENT DOCUMENTS

| | | | |
|---|---|---|---|
| 3,122,118 | 2/1964 | Cooper | 219/158 |
| 3,517,155 | 6/1970 | Mantel et al. | 219/73 R |
| 3,525,844 | 8/1970 | Johnson | 219/73 R |
| 4,063,059 | 12/1977 | Brolund et al. | 219/158 |
| 4,342,897 | 8/1982 | Murai et al. | 219/73.2 |

Primary Examiner—C. L. Albritton
Assistant Examiner—Alfred S. Keve
Attorney, Agent, or Firm—Leydig, Voit & Mayer, Ltd.

[57] ABSTRACT

A submerged arc welding machine in which the edges of plates to be butt welded are supported on a channel fixed on a long rigid foundation beam. The plates are otherwise held on inverted caster wheel assemblies. A long rigid bridge spaced above the beam carries a track on which the arc welding apparatus carriage rides. The plate edge portions are held by vertically movable electromagnets, and the channel forms a magnetic shield so that the magnets do not affect the welding arc. Vertically movable rollers allow the plates to be positioned without interference from the channel. A copper backup bar in the channel has a groove that is filled with flux, and the bar is raised to hold the flux under the weld line. A shoe on the carriage lays flux in the groove when the carriage returns after a welding pass, and a vacuum pickup head cleans the groove for the shoe flux delivery. During the welding pass, the pickup head removes flux on opposite sides of the weld.

12 Claims, 8 Drawing Figures

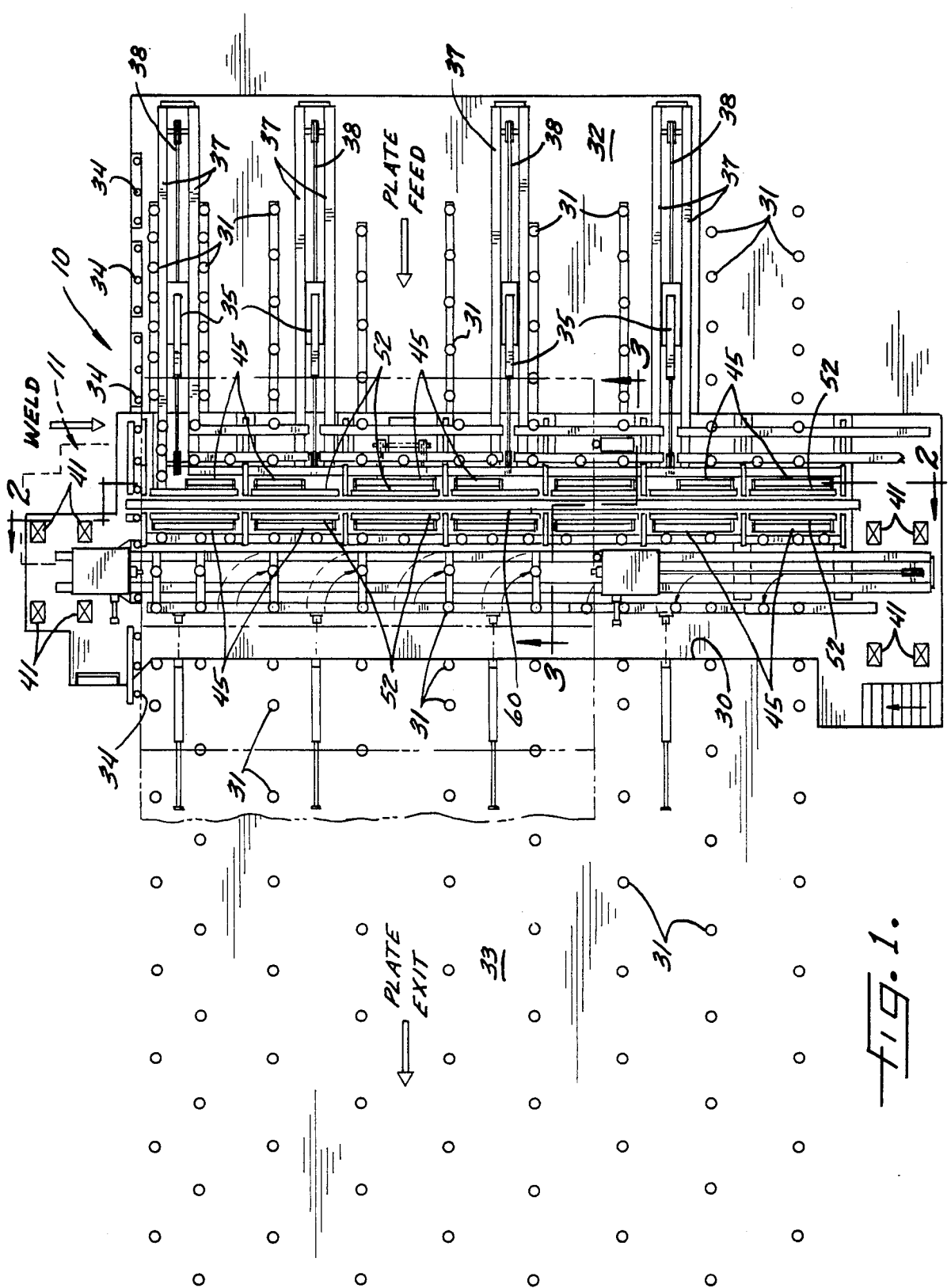

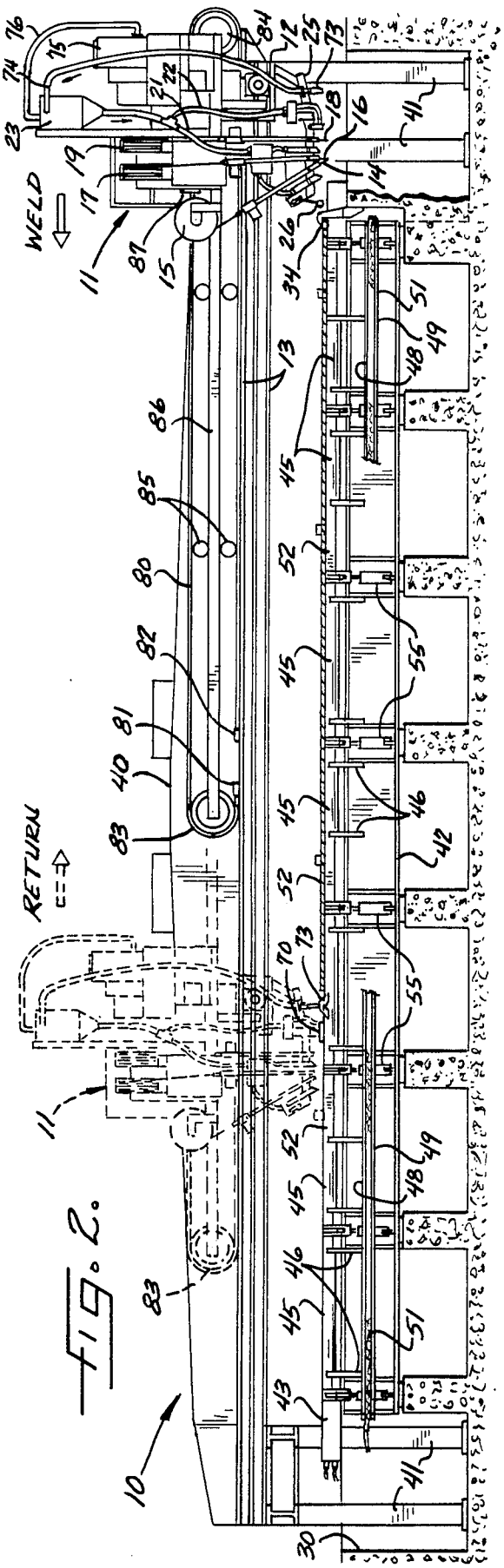

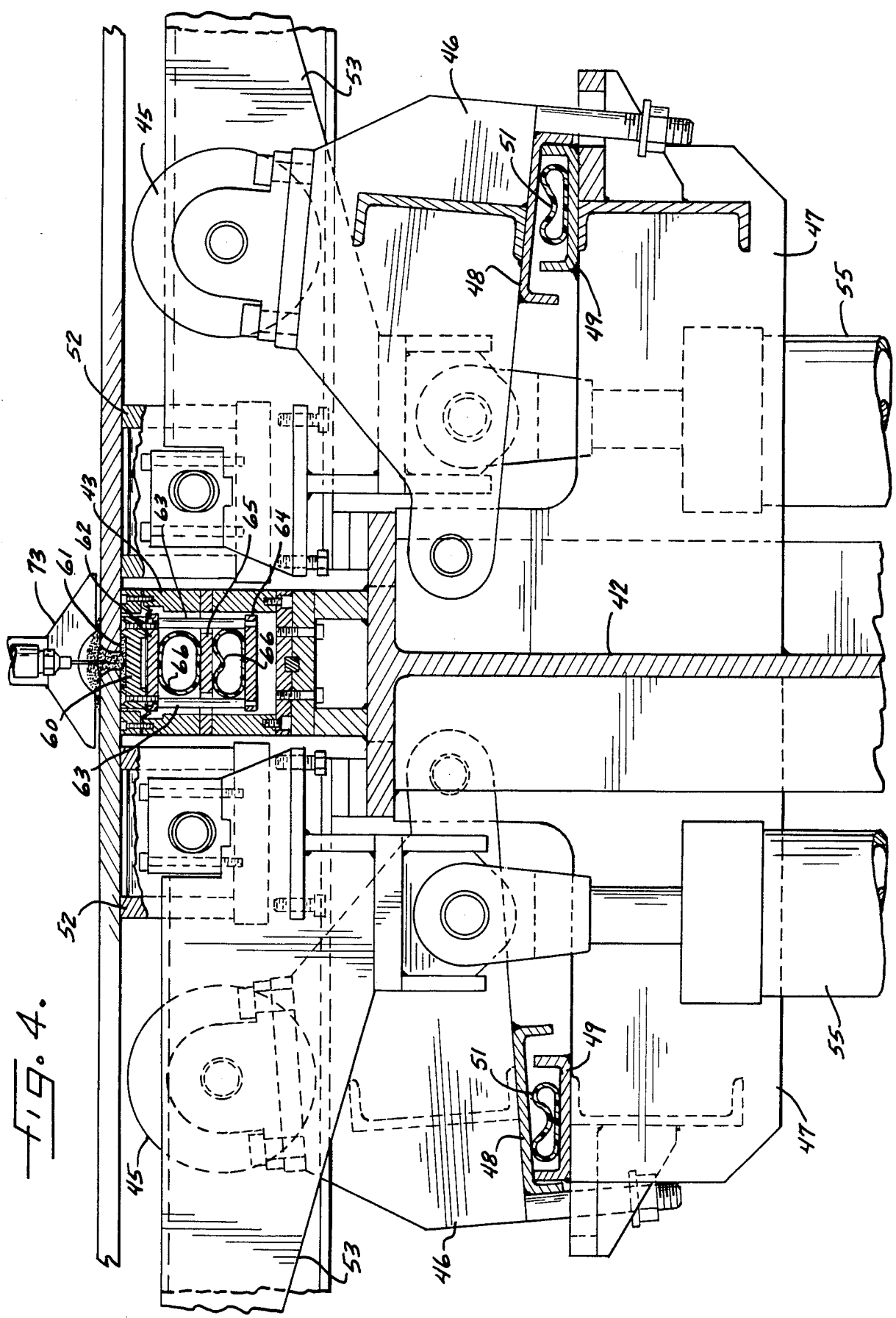

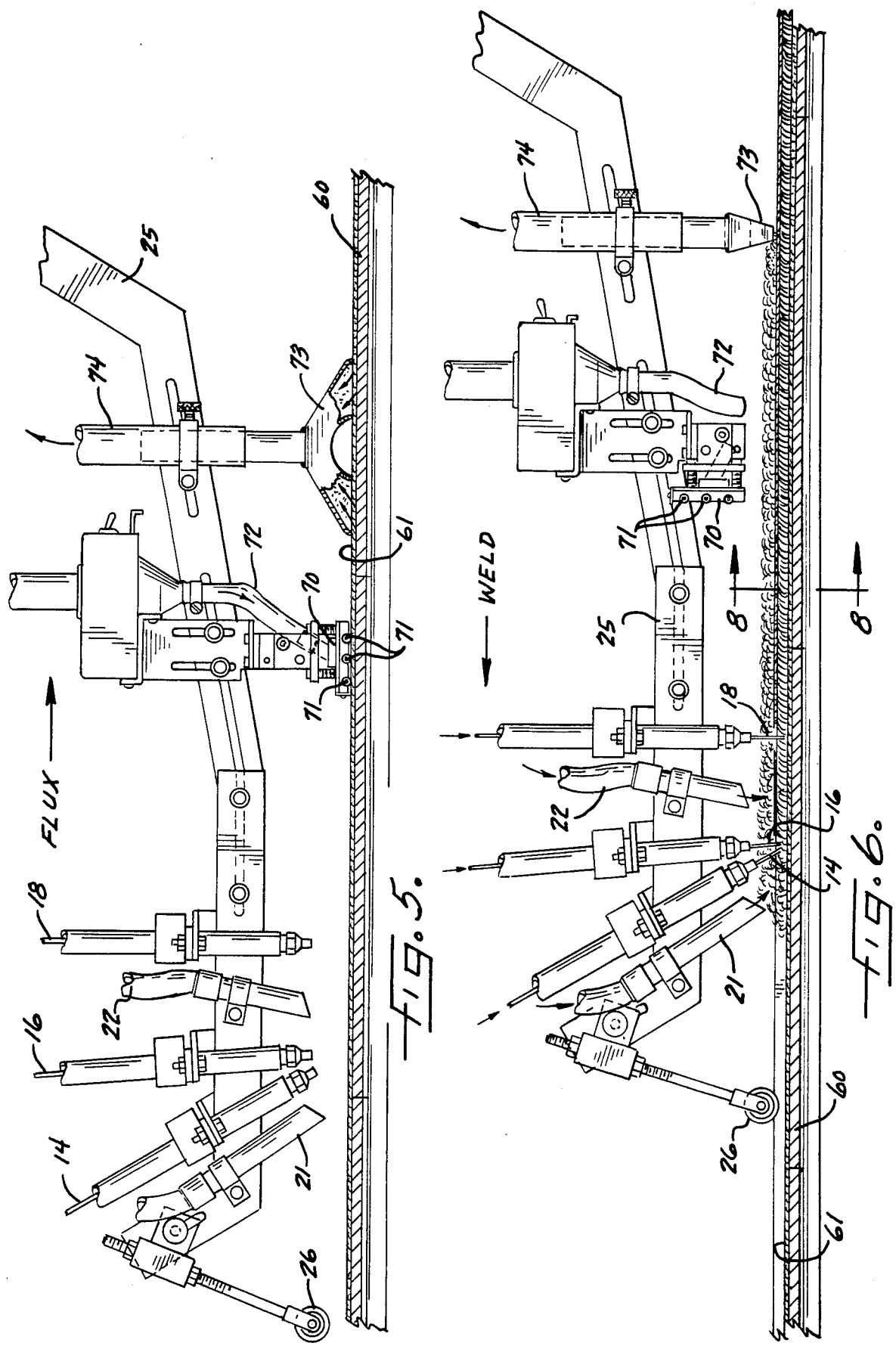

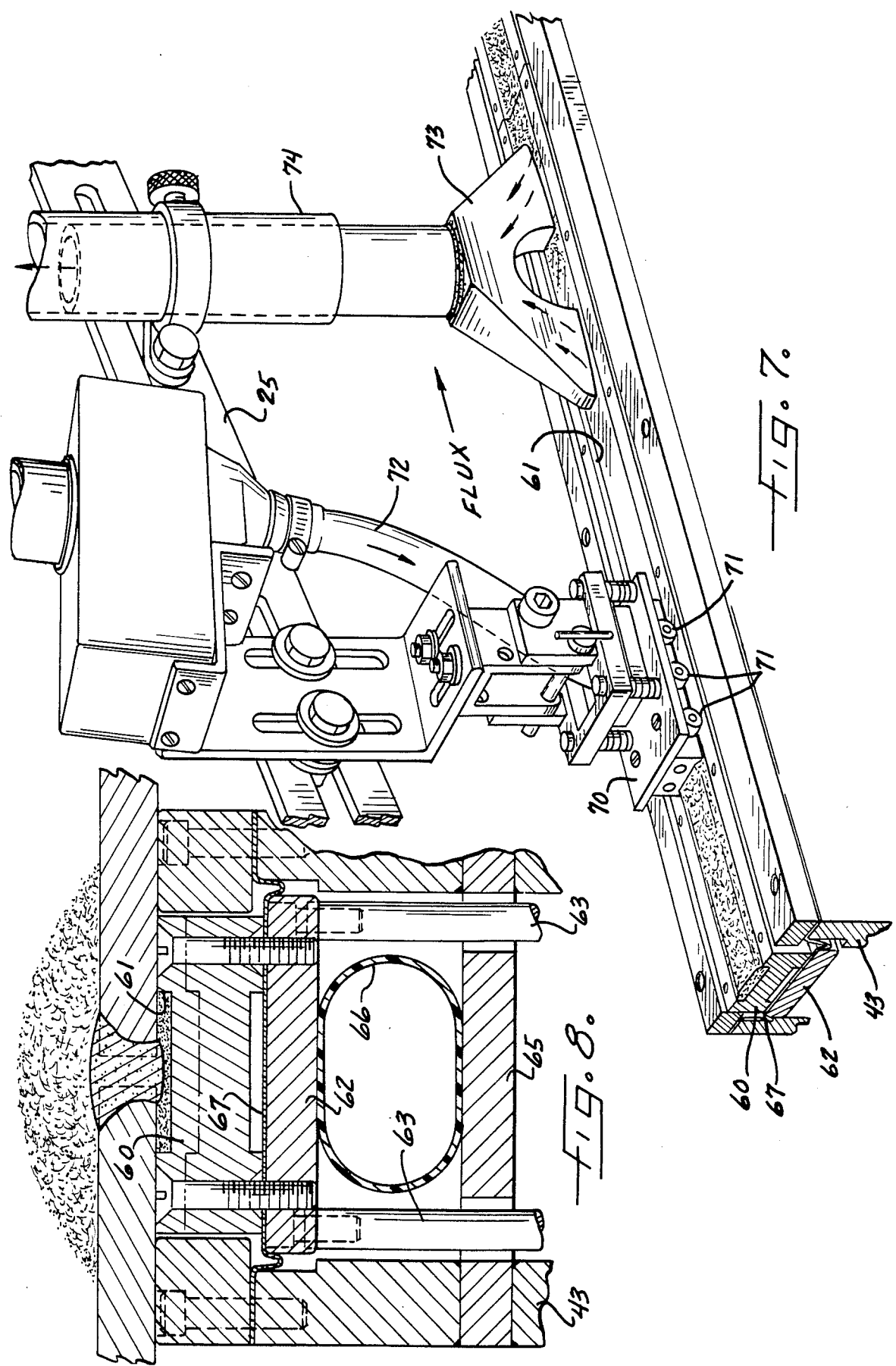

LARGE PLATE ARC WELDER

This invention relates generally to arc welding and more particularly concerns welding machines for joining large plates.

In construction involving the assembly of steel plates, such as the shipbuilding industry, it is desirable to assemble in-plant large weldments where the welding can be done economically under tightly controlled conditions. The larger the weldment segments, the less welding is required at the final assembly site where welding is substantially more expensive.

It will be apparent that even in-plant welding of segments for a large structure such as a ship is minimized if the steel plates used are large. It is presently practical to obtain plates having thicknesses in the one-half to 1¼" range that are 50 feet long and 10 feet wide. Making large, in-plant weldments using such plates therefore calls for welds up to 50 feet in length. With several 50×10 foot plates joined, there are obvious problems in handling the weldment, particularly if it were necessary to turn the plates over to permit welding of a joint from both sides of the plates.

One way welding from both sides of a joint has been avoided is to bevel the plate edges to be joined. However, grinding or cutting the bevels is expensive, and if a large plate is somewhat wavy, a non-uniform bevel could well be formed. In contrast, if a straight up and down cut is made on a wavy plate, the edge will still be straight and true.

Accordingly, it is the primary aim of the invention to provide a welding machine capable of joining large plates by submerged arc welding butt joints between the plates, without welding from both sides and with no need for beveling. It is also an object of the invention to provide a machine of the foregoing type that will produce such welds in a single pass of the welding apparatus.

Another object is to provide a machine of the above kind that will handle plates which already have had stiffening ribs welded to them. In shipbuilding, it is often desirable to shape a large plate and to weld on stiffening ribs before the plate is joined to adjacent plates.

A further object is to provide a machine as characterized above which provides accurate spacing control of the plate edges before and during welding, accurate arc control for a constant arc, and accurate control fo the flux both above and below the weld—and as a result of such control reliably produces sound welds.

Other objects and advantages of the invention will become apparent upon reading the following detailed description and upon reference to the drawings, in which:

FIG. 1 is a plan view of a machine embodying the invention;

FIG. 2 is a section and side elevation of the machine shown in FIG. 1;

FIG. 3 is a fragmentary enlarged section taken approximately along the line 3—3 in FIG. 1;

FIG. 4 is an enlarged section of the center portion of the structure shown in FIG. 3 with parts in alternate positions;

FIG. 5 is a fragmentary section and side elevation of a portion of the structure otherwise shown in FIG. 2;

FIG. 6 is similar to FIG. 5 with the parts in a different operation position;

FIG. 7 is a fragmentary perspective, somewhat enlarged, of a portion of the structure otherwise shown in FIG. 5; and FIG. 8 is a fragmentary section taken along the line 8—8 in FIG. 6.

While the invention will be described in connection with a preferred embodiment, it will be understood that we do not intend to limit that invention to the embodiment. On the contrary, we intend to cover all alternatives, modifications and equivalents as may be included within the spirit and scope of the invention as defined by the appended claims.

Turning to the drawings, there is shown a welding machine 10 having an arc welding assembly 11 of conventional type mounted on a carriage 12 that travels on a side beam track 13 in conventional fashion. The assembly 11 includes a lead arc wire 14 and feed wheel 15, a ground wire 16 and a feed wheel 17, a trail arc wire 18 and feed wheel 19, and a pair of tubes 21 and 22 for delivering flux from a supply tank 23. These elements are held in position by an arm 25 which is guided by a finder wheel 26. The assembly welds traveling from right to left in FIGS. 2 and 6.

The machine 10 is mounted in a pit 30 which allows the plates being welded to remain substantially at floor level. Plate movement is facilitated by providing a plurality of inverted caster wheels 31, shown diagrammatically as small circles in Fig. 1, that define a plate feed plane 32 and a plate exit plane 33. A row of snubber rollers 34 provide a positioning edge for the plates, and after a plate is moved upwardly in FIG. 1 over the feed plane 32 and against the snubber rollers 34, four pushers 35 having wheels 36 which ride in a frame 37 are driven by chains 38 to move the plates from the feed plane 32 toward the exit plane 33.

In carrying out the invention, the side beam track 13 is mounted on a long, rigid bridge 40, mounted on columns 41 in the pit 30, which overlies a heavy foundation beam 42 in the pit 30 carrying a support channel 43 against which the plate edge portions are held during welding. The rigid bridge 40 and the heavy foundation beam 42 permit accurate establishment, and maintenance, of proper arc spacing relative to the plates being welded. Also, the bridge 40 is spaced well above the support channel 43 so that plates already carrying stiffening ribs can pass freely through the machine 10.

To permit easy movement of plates over the support channel 43, a row of rollers 45 are mounted on either side of the channel 43 on arms 46 that are pivoted on plates 47 that are secured to the foundation beam 42. The arms 46 also carry channel members 48 which overlie channel members 49 mounted on the plates 47, and a fire hose 51 is fitted between the members 48, 49. By charging the hoses 51 with air, the rollers 45 are pneumatically raised above the upper level of the support channel (see FIG. 3) so that the plates can be easily rolled over the support channel 43.

In keeping with the invention, the plate edge portions are firmly held against the support channel by rows of electromagnets 52 mounted on arms 53 that are pivoted on frame structure 54 in the pit 30. The arms 53 are swung by hydraulic actuators 55 so as to raise the magnets 52 into gripping contact with the plates, and to pull those plates firmly against the support channel 43. Use of the hydraulic cylinders 55 gives good control of the holding force applied to the plates so that the edge portions of thinner plates are not distorted by strong forces used to hold thick plates reliably in position.

Although the electromagnets 52 are close to the support channel 43, thereby giving good control of the edge portions being welded but also placing the electromagnets close to where the arc is formed, the support channel 43 is formed of heavy magnetic material so that it, together with the overlying plates, forms a magnetic shield around the weld region. This prevents magnetic effects from the electromagnets 52 from disturbing the welding arc once it is established.

As a feature of the invention, flux control on the underside of the weld is provided by a backup bar 60 having a groove 61 that is filled with flux and which is urged firmly against the underside of the plates being welded. To minimize the likelihood of the bar 60, actually a series of bars mounted end-to-end, becoming welded to the plates, the bars are formed of copper, which is a good heat conductor. The bars 60 lay on the upper plate 62 of an assembly including rods 63 and a lower plate 64 fitted into the support channel 43. The rods 63 pass loosely through holes in a plate 65 dividing the support channel 43 into upper and lower portions. A pair of fire hoses 66 are positioned one between the plates 62 and 65, and one between the plates 64 and 65. By inflating the upper hose 66, the backup bar 60 is pneumatically raised so that it presses against the underside of the plates being welded. By inflating the lower hose 66, and deflating the upper one, the support for the bar 60 is positively pulled down from the plates. A strip of asbestos cloth 67 across the top of the support channel 43 keeps flux from falling into the channel.

As another feature of the invention, flux is uniformly deposited in the backup bar channel 61 from the supply tank 23 through an open bottom shoe 70 during return movement of the welding assembly 11. The shoe 70 is mounted on the arm 25 and is formed with a plurality of wheels 71 which ride on the bar 60. Flux is supplied through a tube 72. Behind the shoe 70, a vacuum pickup head 73 is mounted on the arm 25. The head 73 is connected through a tube 74 to the flux supply tank 23, and a vacuum is created for the head 73 by a pump 75 connected to the tank 23 by a line 76.

The head 73 can be turned 90° on a vertical axis so that during the flux depositing return movement, the head 73 sucks the remaining flux from the groove 61 (see FIGS. 5 and 7) prior to the deposit of a new controlled amount of flux thorugh the shoe 70. During the welding pass, the head 73 is rotated so that it will pick up excess flux at the sides of the weld that had been laid through the tubes 21, 22 (see FIG. 6). During the welding pass, the shoe 70 is swung and pinned up to clear the weld.

To keep power cables and control lines to the welding assembly 11 in order, a heavy belt 80 is attached to the bridge 40 at points 81 and 82, and is trained over pulleys 83 and 84, and idlers 85, journalled on a beam member 86. The belt is anchored as at a point 87 to the assembly 11. Thus, novement of the assembly 11 on the side beam track 13 pulls along the belt 80 which moves the beam member 86. The belt distance between the points 81 and 82 and the attachment point 87 however remains the same in all positions of the assembly along its track. In this way, power cables and control lines can be laid in recesses in the belt 80 at the points 81 and 82 and brought to the assembly 11 through the point 87, and those cables and lines will remain of constant length and in controlled position dictated by the belt 80.

Operation of the machine 10 can now be readily appreciated. The first plate of a series to be welded is pushed over the caster wheels 31 defining the plate feed plane 32 against the snubber rollers 34. The plate edge to be welded remains a straight right angled edge with there being no need for beveling. The pushers 35 move the plate under the bridge 40 onto the plate exit plane 33 with the rollers 45 being raised so that the plate clears the support channel 43.

By this time, the welding assembly 11 will have moved from left to right as seen in FIG. 2, with the shoe 70 laying a controlled amount of flux in the groove 61 of the backup bar 60. A second plate to be welded to the first in then positioned by the pushers 35 and the proper plate spacing between the edges to be welded is established. The electromagnets 52 are energized and raised to grip the plates and pull them firmly against the support channel 43. The backup bar is raised so as to hold flux beneath the edges to be welded, and the welding apparatus is adjusted and activated to initiate the arc and begin the traveling movement of the apparatus to complete the weld.

On completion of one weld, the welded plates can be pushed onto the plate exit plane 33, riding on the casters 31, by the pushers 35 and another plate brought into position.

The machine 10 has been found to make good welds of the type illustrated in FIG. 8 in a single pass on only one side of the plates and normally without the need for beveling. This is in part attributable to the accurate spacing control before and during welding resulting from the rigid path provided by the bridge 40 for the welding apparatus, the solid underlying support from the foundation beam 42 and the positive gripping action exerted by the electromagnets 52. Accurate arc control also results from the stability of the bridge 40 and from the existence of the magnetic shielding resulting from the support channel 43. Good welding also results from good flux control, and while flux delivery from the tubes 21, 22 is conventional in a submerged arc welding machine, the additional underlying flux control afforded by the groove 61 in the backup bar 60 assures that the arc is completely submerged during the single pass weld.

We claim as our invention:

1. A welding machine for large plates comprising, in combination, a long rigid foundation member, a support channel fixed to the top of said foundation member and running the length of the weld to be made, a long rigid bridge mounted above and parallel to said foundation member, a track mounted on said bridge parallel to said support channel, a carriage carrying an arc welding assembly mounted for movement along said track, means for supporting plates on each side of said foundation member approximately the level of the top of said support channel, and means adjacent and along the length of said foundation member for securely holding the edge portions of a pair of plates against the top of said support channel so that the plate edges are spaced and parallel for welding by said assembly as it is moved down said track, said means for holding plates comprising a plurality of elongated electromagnets on opposite sides of said support channel together with means for raising and lowering the electromagnets into contact with the edge portions of a plate and pulling the plate firmly against the channel.

2. The combination of claim 1 in which said channel member is formed of heavy magnetic material that, together with the plates being welded, forms a magnetic shield around the weld region protecting the welding arcs from effects caused by the electromagnets.

3. The combination of claim 1 in which said means for raising and lowering the electromagnets consists of hydraulic cylinder actuators so that the plate pulling pressure can be controlled to suit the thickness of the plates.

4. The combination of claim 1 in which said means for supporting plates consist of a plurality of upside down caster wheels assemblies, and the combination includes a row of snubber rollers running perpendicularly of the support channel to help guide plates into proper position for welding.

5. The combination of claim 1 including two rows of vertically movable rollers parallel and on opposite sides of the support channel, and means for raising the rollers so as to allow plates to be rolled over said channel without interference.

6. The combination of claim 5 in which said means for raising the rollers consists of a fire hose for each row of rollers which, when charged with air, pneumatically raises the lines of rollers.

7. The combination of claim 1 including a flux backup bar in said channel, said bar having an elongated groove for holding a measured volume of flux, and means in said channel for raising and lowering said bar so that the bar with flux in said groove can be raised from a recessed position against the underside of the plate edges to be welded.

8. The combination of claim 7 in which said bar is formed of copper, having high heat transfer rates, so as to minimize the likelihood of the bar being welded to the plates.

9. The combination of claim 7 in which said means for raising and lowering the bar consists of a pair of fire hoses in said channel coupled to the bar so that charging one hose with air will pneumatically raise the bar and charging the other hose with air will pneumatically lower the bar.

10. The combination of claim 7 in which said welding assembly includes a flux supply, the combination also including an open bottom shoe mounted on said carriage for movement over said backup bar groove, means for delivering flux from said supply to said shoe as the carriage returns from making a welding pass so that said elongated groove is loaded with a controlled volume of flux for the next welding pass.

11. The combination of claim 10 including a vacuum pickup head on said carriage positioned to overlie the backup bar so that the groove is first sucked clean before a new charge of flux is deposited through said shoe.

12. The combination of claim 11 in which said pickup head has two positions, one position closely overlying said groove and a second position straddling the groove so that during a welding pass excess flux on either side of the weld being made can be recovered by the head.

* * * * *